Dec. 28, 1943.   W. H. SHORTELL   2,337,629
TENSION GAUGE FOR HACK SAW BLADES
Filed Dec. 27, 1941

INVENTOR
WILLIAM H. SHORTELL
BY
Frederic P. Warfield
ATTORNEY

Patented Dec. 28, 1943

2,337,629

UNITED STATES PATENT OFFICE 2,337,629

TENSION GAUGE FOR HACK SAW BLADES

William H. Shortell, Greenfield, Mass., assignor to Millers Falls Company, Greenfield, Mass., a corporation of Massachusetts Application December 27, 1941, Serial No. 424,566

7 Claims. (Cl. 29—73)

This invention relates to hack saws and particularly to a method for increasing the useful life of a power driven hack saw blade and to a device which may be used to carry out the method.

A primary object of the invention is to provide a method for reducing the tendency of a power driven hack saw blade to break while in use and for maintaining it in accurate cutting alignment by adjusting the tension of the blade to a predetermined value and thus increasing the useful life and efficiency of the blade.

Another object of the invention is to provide a simple, inexpensive device which may be formed as a part of a power hack saw frame or provided as an attachment therefor by means of which the tension of the blade may be adjusted to a predetermined desired value.

Still another object of the invention is to provide a device for maintaining a predetermined tension on a power driven hack saw blade which will not vary substantially if the blade contracts or the holes in the ends start to elongate.

Another object of the invention is to provide a power hack saw which will maintain its cutting accuracy when the teeth are worn or the end holes have become elongated.

Another object of the invention is to provide a device for a power hack saw frame by means of which the operator can adjust the tension of the blade and can tell at a glance what the tension on the blade is at any time.

Other objects of the invention will in part be obvious and will in part appear hereinafter.

The invention accordingly comprises the several steps and the relation of one or more of such steps with respect to each of the others, and the apparatus embodying features of construction, combinations of elements, and arrangement of parts which are adapted to effect such steps, all as exemplified in the following detailed disclosure, and the scope of the application of which will be indicated in the claims.

For a fuller understanding of the nature and objects of the invention reference should be had to the following detailed description taken in connection with the accompanying drawing, in which.

My invention is based upon the discovery that the useful life of a power hack saw blade and its cutting efficiency can be greatly increased by increasing the longitudinal tension on the blade materially above that normally applied to the blade. The blade will have a maximum life if the resistance to breakage is a maximum when a transverse load is applied to the blade midway between the ends thereof.

It has been the practice heretofore in using hack saw blades to tighten the blade in the saw frame merely to the extent of eliminating looseness and any tendency for the blade to move sideways while the saw is in motion. In applying a tension to a hack saw blade it has been thought that great care must be exercised in order not to apply so much tension that the end holes of the blade would be stretched out or broken. I have found that there is an optimum tension for any blade at which the blade will have the greatest resistance to breakage, and that increasing the tension above this value will effect substantially no improvement with respect to breakage resistance and may even increase the tendency of the blade to break. I have also discovered that this optimum tension is greatly above that normally used on hack saw blades but far below that necessary to break the holes in the ends of the saw blade. This optimum tension at which the blade has the least tendency to break is dependent of course on the size and composition of the blade and will, therefore, be different for blades of different sizes and compositions. According to the tests I have made, this optimum tension is in the neighborhood of half the tensile load necessary to tear out the holes in the ends of the blade.

The increase in breakage resistance by increasing the tension on the blade is quite startling. In one instance where the tension of the blade was increased from 400 pounds to 1500 pounds, the resistance to breakage was approximately doubled. To indicate about what this optimum tension may be for saw blades of different sizes and the relation between this optimum tension and the tensile load necessary to break the holes at the ends of the saw blade, the following figures are given by way of illustration:

| Nominal size | Optimum tension | Tensile load to break holes |
|---|---|---|
| | Lbs. | Lbs. |
| 14 x 1    x .065 | 2,100 | 4,400 |
| 14 x 1¼ x .065 | 2,600 | 4,700 |
| 18 x 1½ x .072 | 2,800 | 5,600 |
| 18 x 1¾ x .072 | 3,000 | 6,300 |

It is possible, of course, to obtain this optimum tension with any saw blade by tightening the nut which holds the pin stud, but it is extremely difficult to determine by this method when the optimum tension has been reached. I, therefore, prefer to use a tension-adjusting device which is provided with an indicator so that the operator can see at a glance just what tension is applied to the blade while he is making the adjustment.

Figure 1:
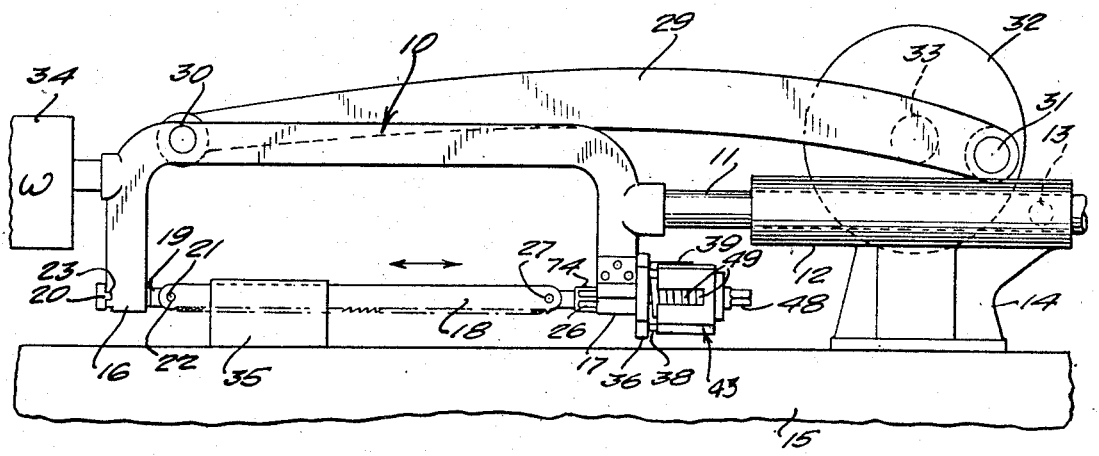
Fig. 1 is a side elevational view of a power hack saw showing one form of device applied thereto to attain the objects of the invention.
Figure 2:
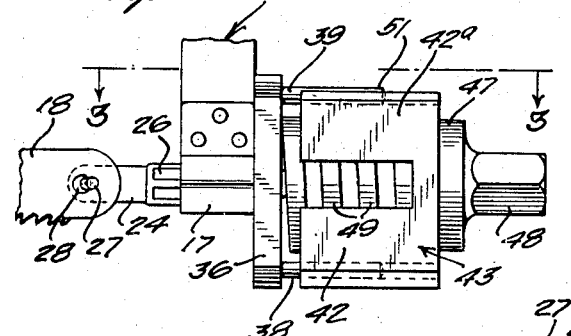
Fig. 2 is an enlarged side elevational view of the tensioning device shown in Fig. 1.
Figure 4:
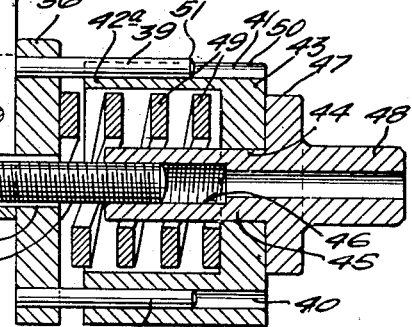
Fig. 4 is a further enlarged sectional side elevational view of the tensioning device shown in Figs. 1, 2, and 3.

One form of tension-adjusting device is shown in the drawing as applied to a power operated hack saw, portions of the machine having been shown in Fig. 1. The bowed hack saw frame 10 is mounted on the end of an arm 11 which is slidably supported for longitudinal movement in a sleeve 12, the sleeve being pivoted at 13 to a suitable bracket 14 rigidly mounted on the supporting table 15. The arrangement is such that the frame 10, arm 11, and sleeve 12 may be swung upwardly or downwardly about the pivot 13.

The frame 10 terminates in sleeves 16 and 17 and the saw blade 18 is mounted between them. To this end the sleeve 16 is provided with a stud 19 having a suitable head 20 at the outer end thereof and a transverse pin 21 at the inner end over which the hole 22 in the saw blade is placed. The stud 19 is prevented from rotating by means of a lug 23 which engages a notch in the outer end of the sleeve 16.

The sleeve 17 is preferably squared in cross section and is provided with a stud 24, the outer end 25 of which is threaded, while a portion of the stud is squared, as indicated at 26. The inner end of the stud 24 is provided with a transverse pin 27 which is adapted to engage the hole 28 in the end of the saw blade.

Under normal conditions the threaded end 25 of the stud 24 is provided with a nut which pulls against the sleeve 17 and holds the saw blade under tension when the nut is tightened. The tension indicating device shown in the drawing may be applied in place of this usual nut.

Reciprocating movement of the hack saw is effected by means of an arm 29 which is pivoted to the forward end of the frame 10, as at 30, the other end of the arm 29 being pivoted at 31 at the periphery of a wheel 32 which is centrally mounted on a shaft 33 driven by an suitable source of power. Rotation of the wheel 32 causes the pivot 31 to rotate about the center 33 producing a crank effect on the arm 29, thus causing the arm to move back and forth and carrying the saw frame with it. A suitable weight 34 may be provided on the end of the saw frame 10 to give the desired pressure of the saw blade 18 against the work 35 which is clamped in any desired manner upon the bed or table 15 of the machine. As the cut progresses and the saw blade moves through the work, the frame and associated parts rotate about the pivot 13 under the action of the weight 34.

In this device a plate 36 is positioned against the outer end of the sleeve 17, the plate having a hole 37 through which the stud 24 passes. The plate 36 has a pair of rods 38 and 39 attached to it at opposite points near the periphery thereof and extending perpendicularly from the plate, and these rods engage holes 40 and 41 which are formed respectively in the arms 42 and 42ᵃ of a yoke 43, the holes being parallel to the axis of the yoke. The yoke 43 has a central hole 44, and a sleeve 45 extends through this hole 44 and has a threaded bore 46 for engaging the threaded end 25 of the stud 24. The sleeve 45 has a flange 47 which bears against the outer surface of the yoke 43, and the outer end 48 of the sleeve 45 is made hexagonal, forming a nut which can be turned with a wrench. The yoke 43 together with the plate 36 forms a housing which encloses a stiff coiled spring 49, the spring bearing at one end against the inner surface of the yoke 43 and at the other end against the inner surface of the plate 36.

It will be seen that the stud 24 can be drawn through the sleeve 17 towards the sleeve 45 by rotating that sleeve in the proper direction, thus putting a tension on the blade 18 which acts to contract the spring 49.

Figure 3:
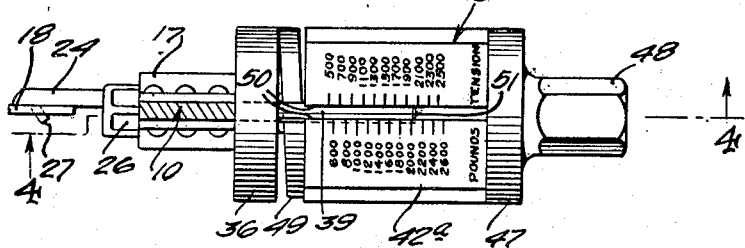
Fig. 3 is a plan view of the tensioning device of Figs. 1 and 2 showing the indicating scale.

The device is calibrated to indicate the tension on the saw blade. The indicating arrangement is shown best in Fig. 3 which is a plan view of the device as attached to the saw blade when held in the position shown in Fig. 1. A portion of the wall of the arm 42 adjacent the hole 41 is cut away throughout the length of the yoke, thereby exposing the longitudinal edges 50 of the hole 41 in which the end 51 of the rod 39 can be clearly seen. The flattened portion of the arm 42 is marked in pounds, as indicated, the scale being arranged so that the end 51 of the rod 39 will indicate the compressive force applied to the spring 49.

The operator has only to tighten upon the nut 48 formed at the end of the sleeve 45 until the end 51 of the rod 39 appears opposite the number which is recommended for the optimum tension on the saw blade. With this adjustment the blade will have a maximum useful life.

The device, as has been stated, may be manufactured for application to any existing power hack saw frame, in which case the operator merely removes the nut which is commonly provided on the threaded end of the stud 24 and slips the plate 36 of the device over the end of the stud, engaging the threads with the sleeve 45. Tightening the sleeve will produce the effect already described. Where it is desired to build the device into the saw frame, the plate 36 may be made integral with the sleeve 17 or it may be attached to it in any desired manner.

I have found that not only is the life of the saw blade increased by tensioning the blade in the manner described above, but the cutting accuracy of the blade is maintained even after the teeth are worn down. Moreover, the resiliency of the spring in the tensioning device compensates for changes in length of the blade caused by temperature variations or elongations of the end holes, and thus prevents breakage from an increase or decrease of blade tension from these and other causes.

It will be seen from the above that I have provided a method by means of which the useful life of a power hack saw blade may be increased and the cutting accuracy thereof maintained by adjusting the tension of the saw blade to a predetermined optimum value and maintaining it at that value, and that I have also provided a device by means of which the tension of the blade may be so adjusted and maintained, and in which the tension value may be seen by the operator at a glance, so that he may know when the blade is supplied with the proper tension.

Since certain changes in carrying out the above process and in the constructions set forth which embody the invention may be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention what I claim as new and desire to secure by Letters Patent is:

1. The method of increasing the useful working life and the efficiency of a power hack saw blade which comprises adjusting the tension of the hack saw blade as mounted for use to a value which is approximately half of the tension required to break the hack saw blade at the end holes.

2. A power hack saw comprising a frame, means to mount said frame for guided reciprocating movement, means to reciprocate said frame, a saw blade, means at one end of said frame to secure one end of said saw blade, a stud adapted to be attached to the other end of said saw blade, said stud passing through an opening in the other end of said frame and the outer end of said stud being screw-threaded, a sleeve having a tapped opening therein, threaded on to the end of said stud, a compression spring between said sleeve and said frame whereby rotation of said sleeve in either direction will adjust the working tension of said saw blade, and means to indicate the amount that the spring is compressed.

3. A power hack saw comprising a frame, means to mount said frame for guided reciprocating movement, means to reciprocate said frame, a hack saw blade, means at one end of said frame to secure one end of said hack saw blade, a sleeve at the other end of said frame, a stud adapted to fit slidably within said sleeve and extend beyond the ends thereof, said stud having means to engage the other end of said hack saw blade, the outer end of said stud being screw-threaded, a plate positioned against the outer end of said sleeve and having an opening therein through which the screw-threaded end of said stud extends, a housing spaced from said plate, means extending outwardly from said plate and adapted to cooperate with said housing to permit limited movement of said housing with respect to said plate in a direction of the axis of said stud, a spring within said housing and adapted normally to urge said housing away from said plate, screw-threaded means to engage the outer end of said stud and having a bearing against the outer surface of said housing, whereby rotation of said screw-threaded means will draw said stud into said housing to indicate the amount of compression of said spring.

4. An attachment for power hack saws which comprises a housing composed of two parts, means on one of said parts adapted to cooperate with the other of said parts to permit limited movement of said parts towards and away from each other along the axis of said device, a spring within said housing, an opening in the center of one of said parts and adapted to receive the threaded end of the adjusting stud on a hack saw frame, a sleeve rotatably mounted on the other of said parts and adapted to have threaded engagement with said stud, whereby rotation of said sleeve in one direction will draw said stud into said housing and compress said spring, and means to indicate the amount said spring has been compressed.

5. An attachment for power hack saws which comprises a housing composed of two parts, means attached to one part to permit limited movement of said parts with respect to each other in a direction of the axis thereof, one of said parts being adapted to be placed against the hack saw frame adjacent the blade-tensioning stud, there being a hole through said part to receive said stud, a member rotatably mounted on the other of said parts adapted to have threaded engagement with the said blade tensioning stud of the hack saw, a spring within said housing and normally tending to separate said portions and means to indicate the extent of separation of said portions.

6. An attachment for power hack saws comprising a housing composed of two parts, a pair of outstanding rods attached to one part and cooperating with holes in the other part to permit movement of said parts with respect to each other in the direction of said rods, one of said parts being adapted to be positioned against a hack saw frame and adjacent the tensioning stud for the blade, there being a hole through said part into which said stud is adapted to extend, a spring within said housing and normally tending to separate said parts, a sleeve rotatably mounted on the other of said parts and adapted to have threaded engagement with the end of said stud, whereby rotation of said sleeve will cause said stud to be pulled into said housing thus drawing the parts of said housing together and compressing said spring, a portion of said housing containing the holes for said rods being cut away to disclose one of said holes throughout its length so that the end of the rod moving therein is visible, and a scale on said housing adjacent said opening so that the exact position of the end of said rod may be observed.

7. A power hack saw comprising a frame, means to mount said frame for guided reciprocating movement, means to reciprocate said frame, a saw blade, means at one end of said frame to secure one end of said blade, a stud at the other end of said frame having engagement with the other end of said blade, a calibrated spring mounted upon said stud and resiliently connecting said stud to said frame, a scale showing the compressive strength of said spring at different graduations in pounds and means to adjust the tension of said spring whereby the working tension of said blade may be adjusted in either direction.

WILLIAM H. SHORTELL.